United States Patent
Cui

(10) Patent No.: US 11,343,038 B2
(45) Date of Patent: May 24, 2022

(54) ELECTRONIC DEVICE, WIRELESS COMMUNICATION METHOD AND COMPUTER READABLE MEDIUM

(71) Applicant: Sony Corporation, Tokyo (JP)

(72) Inventor: Tao Cui, Beijing (CN)

(73) Assignee: SONY CORPORATION, Tokyo (JP)

( * ) Notice: Subject to any disclaimer, the term of this patent is extended or adjusted under 35 U.S.C. 154(b) by 613 days.

(21) Appl. No.: 16/325,186

(22) PCT Filed: Sep. 8, 2017

(86) PCT No.: PCT/CN2017/100997
§ 371 (c)(1),
(2) Date: Feb. 13, 2019

(87) PCT Pub. No.: WO2019/041375
PCT Pub. Date: Mar. 7, 2019

(65) Prior Publication Data
US 2021/0336735 A1   Oct. 28, 2021

(30) Foreign Application Priority Data

Aug. 30, 2017 (CN) .......................... 201710765929.7

(51) Int. Cl.
H04L 5/00 (2006.01)
(52) U.S. Cl.
CPC .......... H04L 5/0048 (2013.01); H04L 5/0007 (2013.01)
(58) Field of Classification Search
None
See application file for complete search history.

(56) References Cited

U.S. PATENT DOCUMENTS

| 2016/0013906 | A1* | 1/2016 | Guo ..................... H04L 5/0073 370/329 |
| 2016/0073366 | A1 | 3/2016 | Ng et al. |
| 2016/0234763 | A1 | 8/2016 | Um et al. |
| 2017/0332357 | A1* | 11/2017 | Xu ....................... H04W 72/042 |
| 2018/0084432 | A1* | 3/2018 | Kwak ............... H04W 74/0808 |
| 2018/0115996 | A1* | 4/2018 | Si ...................... H04W 74/0808 |
| 2019/0037481 | A1* | 1/2019 | Zhang .................... H04L 27/26 |
| 2019/0141677 | A1* | 5/2019 | Harrison ............... H04L 5/0096 |
| 2019/0246411 | A1* | 8/2019 | Kim ..................... H04L 5/0091 |
| 2020/0196316 | A1* | 6/2020 | Zhang .................... H04L 5/0053 |
| 2020/0374727 | A1* | 11/2020 | Da Silva ............... H04L 5/0051 |

FOREIGN PATENT DOCUMENTS

CN    105050190 A    11/2015
EP      3018938 A1 *  5/2016   ........... H04L 5/0032

OTHER PUBLICATIONS

International Search Report and Written Opinion dated May 28, 2018 for PCT/CN2017/100997 filed on Sep. 8, 2017, 9 pages (Official Copy).

* cited by examiner

*Primary Examiner* — Kevin Kim
(74) *Attorney, Agent, or Firm* — Xsensus LLP

(57) ABSTRACT

The present disclosure relates to an electronic device, a wireless communication method, and a computer readable medium. The electronic device includes a processing circuitry. The processing circuitry is configured to generate a discovery reference signal for an unlicensed band. The discovery reference signal contains a primary synchronization signal, a secondary synchronization signal and a channel state information reference signal.

18 Claims, 13 Drawing Sheets

ELECTRONIC DEVICE, WIRELESS COMMUNICATION METHOD AND COMPUTER READABLE MEDIUM

CROSS-REFERENCE TO RELATED APPLICATIONS

The present application is based on PCT filing PCT/CN2017/100997, filed Sep. 8, 2017, and claims priority to 201710765929.7, filed in the Chinese Patent Office on Aug. 30, 2017, the entire contents of each of which being incorporated herein by reference.

FIELD

The present disclosure relates generally to the field of wireless communication, and more particularly to an electronic device for wireless communication, a wireless communication method and a computer readable medium.

BACKGROUND

Discovery reference signal (DRS) has been added in 3GPP (3rd Generation Partnership Project) Rel-12 with respect to supporting basic functions of a small cell switch. In licensed assisted access (LAA) in 3GPP Rel-13, the main functions of DRS are still used, and the content and quantity of signals included in DRS are increased.

SUMMARY

A brief summary of embodiments of the present disclosure is set forth below in order to provide a basic understanding of certain aspects of the present disclosure. It should be understood that the following summary is not an exhaustive overview of the present disclosure. It is not intended to identify key or critical aspects of the present disclosure, nor it is intended to define the scope of the present disclosure. Its purpose is simply to present some concepts in a simplified form as a prelude to a more detailed description discussed later.

According to an embodiment, an electronic device for wireless communication is provided which includes a processing circuitry. The processing circuitry is configured to generate a DRS for an unlicensed band. The DRS contains a primary synchronization signal (PSS), a secondary synchronization signal (SSS) and a channel state information reference signal (CSI-RS).

According to another embodiment, an electronic device for wireless communication is provided which includes a processing circuitry. The processing circuitry is configured to generate a DRS for an unlicensed band, and control to transmit the DRS with a shorter subcarrier spacing than a subcarrier spacing corresponding to 15 kHz.

According to yet another embodiment, an electronic device for wireless communication is provided which includes a processing circuitry. The processing circuitry is configured to generate a DRS for an unlicensed band, and when DRSs to be transmitted cannot be completely transmitted within a currently configured discovery measurement timing configuration (DMTC) window period, control to transmit the DRS using an extended DMTC window.

According to still another embodiment, an electronic device for wireless communication is provided which includes a processing circuitry. The processing circuitry is configured to generate a DRS for an unlicensed band, and control to transmit the DRS by a target channel in the unlicensed band without performing an energy detection for the target channel.

According to yet another embodiment, an electronic device for wireless communication is provided which includes a processing circuitry. The processing circuitry is configured to generate a DRS for an unlicensed band, and control to transmit the DRS based on a combination of an omnidirectional channel energy detection and a directional channel energy detection. A manner of the combination of an omnidirectional channel energy detection and a directional channel energy detection includes: performing the omnidirectional channel energy detection, and directionally transmitting the DRS if it is detected that a target channel is idle; if the omnidirectional channel energy detection indicates that the target channel is non-idle, performing directional channel energy detection, directionally transmitting the DRS for a direction detected as being idle, and not transmitting the DRS for a direction detected as being non-idle.

According to another embodiment, an electronic device for wireless communication is provided which includes a processing circuitry. The processing circuitry is configured to generate a discovery reference signal DRS for an unlicensed band. The DRS contains a primary synchronization signal PSS, a secondary synchronization signal SSS and a physical broadcast channel demodulation reference signal PBCH-DMRS. Optionally, the DRS may further contain a channel state information reference signal CSI-RS.

According to still another embodiment, a wireless communication method is provided which includes: generating a DRS for an unlicensed band, where the DRS contains a PSS, an SSS, and a CSI-RS.

According to yet another embodiment, a wireless communication method is provided which includes: generating a DRS for an unlicensed band; and transmitting the DRS with a subcarrier spacing higher than 15 kHz.

According to still another embodiment, a wireless communication method is provided which includes: generating a DRS for an unlicensed band; and when DRSs to be transmitted cannot be completely transmitted within a currently configured DMTC window period, transmitting the DRS using an extended DMTC window.

According to yet another embodiment, a wireless communication method is provided which includes: generating a DRS for an unlicensed band; and transmitting the DRS by a target channel in the unlicensed band without performing an energy detection for the target channel.

According to still another embodiment, a wireless communication method is provided which includes: generating a DRS for an unlicensed band, and transmitting the DRS based on a combination of an omnidirectional channel energy detection and a directional channel energy detection. A manner of the combination of the omnidirectional channel energy detection and the directional channel energy detection includes: performing the omnidirectional channel energy detection, and directionally transmitting the DRS if it is detected that a target channel is idle; if the omnidirectional channel energy detection indicates that the target channel is non-idle, performing the directional channel energy detection, directionally transmitting the DRS for a direction detected as being idle, and not transmitting the DRS for a direction detected as being non-idle.

According to another embodiment, a wireless communication method is provided which includes: generating a discovery reference signal DRS for an unlicensed band. The DRS contains a primary synchronization signal PSS, a secondary synchronization signal SSS and a physical broadcast channel demodulation reference signal PBCH-DMRS. Optionally, the DRS may further contain a channel state information reference signal CSI-RS.

According to yet another embodiment, a computer readable medium is provided which includes executable instructions that, when executed by an information processing device, cause the information processing device to implement the methods described above.

Embodiments of the present disclosure provide a solution for DRS on a new radio (NR) unlicensed band, for example.

BRIEF DESCRIPTION OF THE DRAWINGS

The present disclosure may be better understood by referring to the following description given in conjunction with the drawings, in which the same or similar reference numerals are used throughout the drawings to indicate the same or similar parts. The drawings together with following detailed description are included in the present specification and form a part of the specification, and are used to further illustrate preferred embodiments of the present disclosure and explain the principle and advantage of the present disclosure. In the drawings.

DETAILED DESCRIPTION OF EMBODIMENTS

Embodiments of the present disclosure will be described below with reference to the drawings. The elements and features described in a figure or an embodiment of the present disclosure may be combined with elements and features illustrated in one or more other figures or embodiments. It should be noted that, for the sake of clarity, representations and descriptions of components and processes known to those skilled in the art that are not relevant to the present disclosure are omitted from the drawings and the description.

Figure 1:
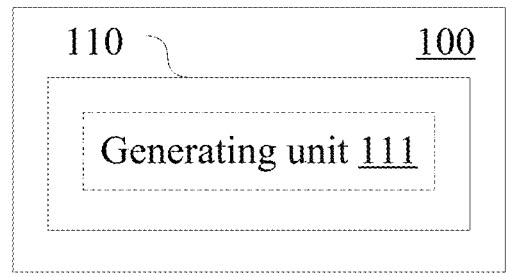
FIG. 1 is a block diagram showing a configuration example of an electronic device for wireless communication according to an embodiment of the present disclosure.

As shown in FIG. 1, an electronic device 100 for wireless communication according to the present embodiment includes a processing circuitry 110. The processing circuitry 110 may be implemented, for example, as a specific chip, a chipset, or a central processing unit (CPU) or the like.

The processing circuitry 110 includes a generating unit 111. It should be noted that, although the generating unit 111 and the like are shown in the form of functional blocks in the drawings, it should be understood that functions of the respective units may be implemented as a whole by the processing circuitry, and it is not necessary to be implemented by discrete actual components in the processing circuitry. In addition, although the processing circuitry is shown by a block in the drawings, the electronic device may include a plurality of processing circuitry, and functions of the respective units may be distributed to the plurality of processing circuitry, thereby cooperatively operating by the plurality of processing circuitry to perform these functions.

The generating unit 111 is configured to generate a DRS for an unlicensed band, the DRS contains a PSS, an SSS, and a CSI-RS.

The DRS is used to enable the device (even in the case of deactivation) to keep in synchronization with a secondary carrier component. Embodiments of the present disclosure provide solutions for DRS on NR unlicensed bands, for example.

Next, a DRS according to an embodiment of the present disclosure and its advantages are illustrated.

In the original DRS design, only one set of synchronization signals (DRS occasions) is included in each subframe, and locations of the DRS patterns are across time slots. However, such a design is wasteful in the NR scenario, because one subframe including one DRS signal means that each DRS transmission is delayed by 1 millisecond compared to the previous DRS transmission, which may make a downlink synchronization period significantly increases, and affecting system efficiency. In addition, the CRS in the original DRS occupies more resources, which may consequently increases resource overhead of a reference signal. Therefore, the present disclosure uses a CSI-RS to implement functions of the original CRS. The CSI-RS may be a cell-level reference signal. In addition, the CSI-RS may have a beam management function to assist the user equipment (UE) and the gNB to perform operations such as a beam pairing.

Figure 13:
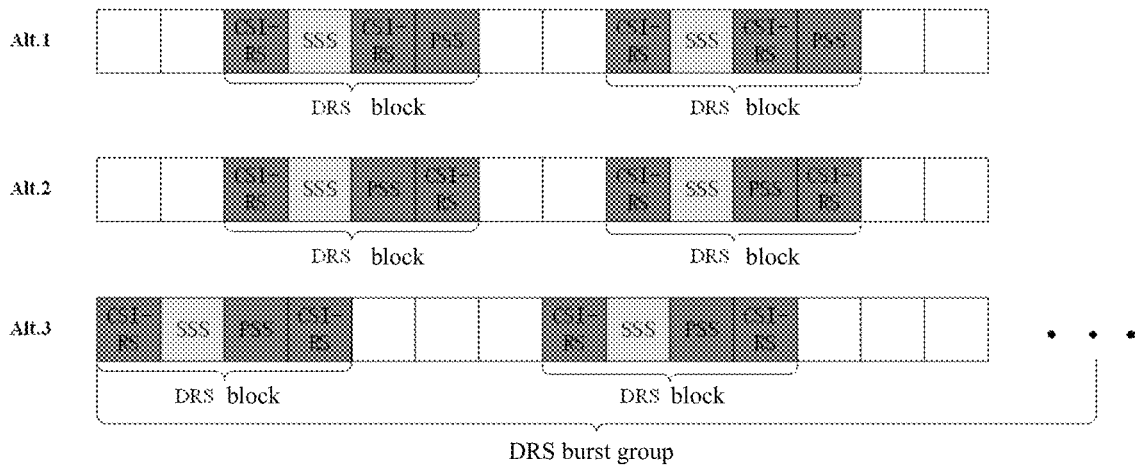
FIG. 13 is a schematic diagram for illustrating an example structure of a DRS according to an embodiment of the present disclosure.

FIG. 13 illustrates an example of a DRS configuration according to an embodiment of the present disclosure. As shown in FIG. 13, a new DRS block (DRS block, which is a minimum unit of downlink synchronization on a NR unlicensed band) is composed of a PSS, an SSS and a CSI-RS, where the PSS and SSS are used for downlink synchronization, and the CSI-RS is used for measurement of a reference signal received power (RSRP) and a reference signal received quality (RSRQ) and a channel downlink channel quality and the like.

It is to be noted that, although several examples (Alt. 1 to Alt. 3) of arrangement order of symbols in a DRS block are given in FIG. 13, the DRS structure according to an embodiment of the present disclosure is not limited to the illustrated examples.

In the illustrated examples, the number of symbols constituting a DRS block is 4, although in other embodiments, the number of symbols constituting a DRS block may be more than 4. For example, in the case where Wi-Fi or other unlicensed band occupation technology is densely deployed, in order to ensure a reliable transmission of a downlink synchronization signal of a NR for a successive occupancy of a channel, a DRS transmission with more than 4 orthogonal frequency division multiplexing (OFDM) symbols may be adopted to ensure a successive occupancy of a wireless channel.

Accordingly, according to an embodiment, one DRS block has a length of at least four OFDM symbols.

As shown in the above examples, according to an embodiment, the PSS, SSS and CSI-RS constituting one DRS block may occupy successive OFDM symbols. Preferably, the PSS, SSS and CSI-RS in the same DRS block may be arranged in the same time slot to thereby further facilitating detection by a user.

However, embodiments of the present disclosure are not limited thereto. For example, the PSS, SSS and CSI-RS in the DRS block may also be inconsecutive (i.e., occupying inconsecutive OFDM symbols in time domain), and may not be arranged in one time slot.

Further, the PSS, SSS and CSI-RS in the DRS block may have various arrangement orders. For example, the signal arrangement orders in the DRS block may include:
PSS, SSS, CSI-RS, CSI-RS;
PSS, CSI-RS, SSS, CSI-RS;
CSI-RS, PSS, SSS, CSI-RS;
PSS, CSI-RS, CSI-RS, SSS;
CSI-RS, PSS, CSI-RS, SSS;
CSI-RS, CSI-RS, PSS, SSS;
SSS, PSS, CSI-RS, CSI-RS;
SSS, CSI-RS, PSS, CSI-RS;
CSI-RS, SSS, PSS, CSI-RS;
SSS, CSI-RS, CSI-RS, PSS;
CSI-RS, SSS, CSI-RS, PSS; or
CSI-RS, CSI-RS, SSS, PSS.

According to an embodiment, in one DRS block, the PSS and SSS (the order of the PSS and SSS is not limited) may be arranged before the CSI-RS. By arranging a synchronization signal before the CSI-RS, a user can, for example, directly perform synchronization sequence correlation without buffering synchronization data (DRS), thereby completing the downlink synchronization quickly.

In addition, according to an embodiment, two successively arranged CSI-RSs may be included in one DRS block. The successive arrangement of CSI-RSs facilitates reducing complexity of UE detection, for example.

The above illustrates an example arrangement manner of signals in a DRS block in time domain. In addition, according to an embodiment, the CSI-RS may be full-bandwidth in frequency domain, while the PSS and SSS may occupy only a predetermined number of central subcarriers.

The CSI-RS being full-bandwidth means that the CSI-RS may be configured on any subcarrier over the entire bandwidth, the any subcarrier may be determined according to specific applications and needs. The number of CSI-RSs may be determined according to antenna ports, and each resource block (RB) may be provided with a CSI-RS.

Figure 18:
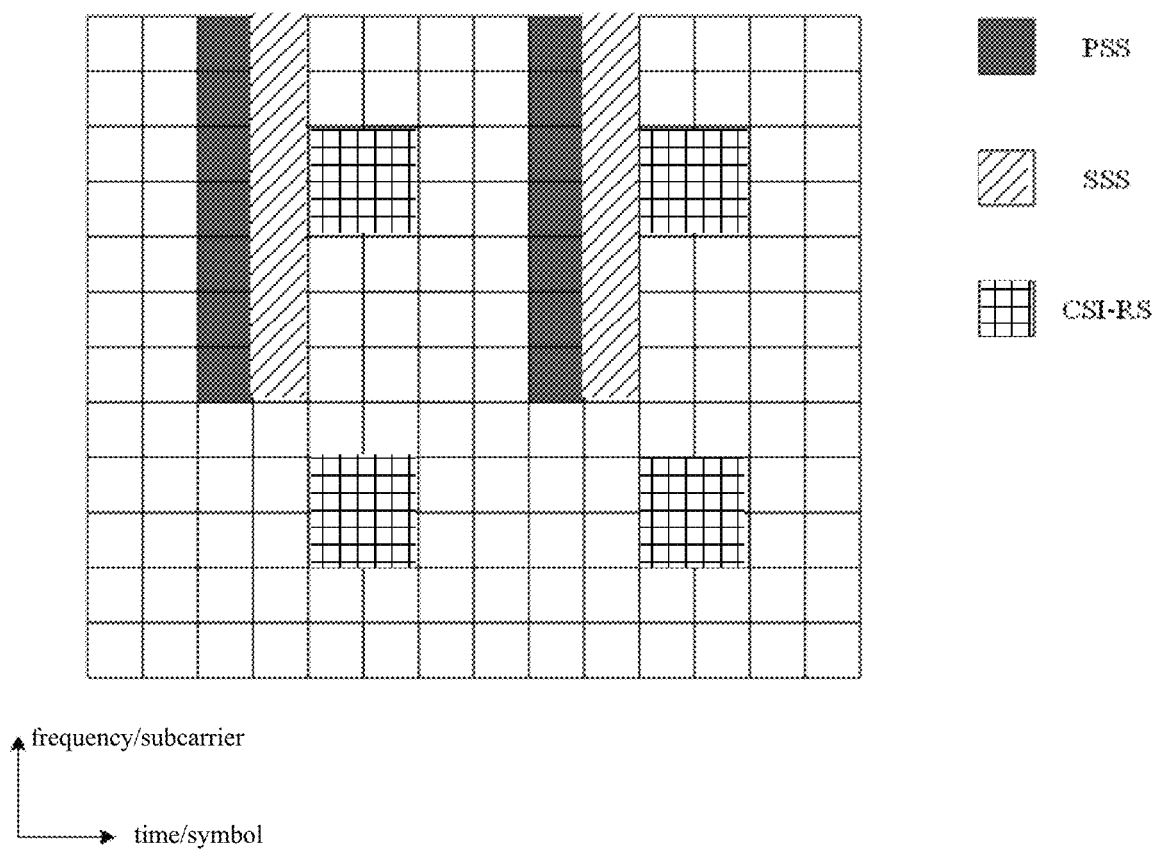
FIGS. 18 and 19 are schematic diagrams for illustrating examples of time-frequency resources of respective signals in a DRS according to an embodiment of the present disclosure.
Figure 19:
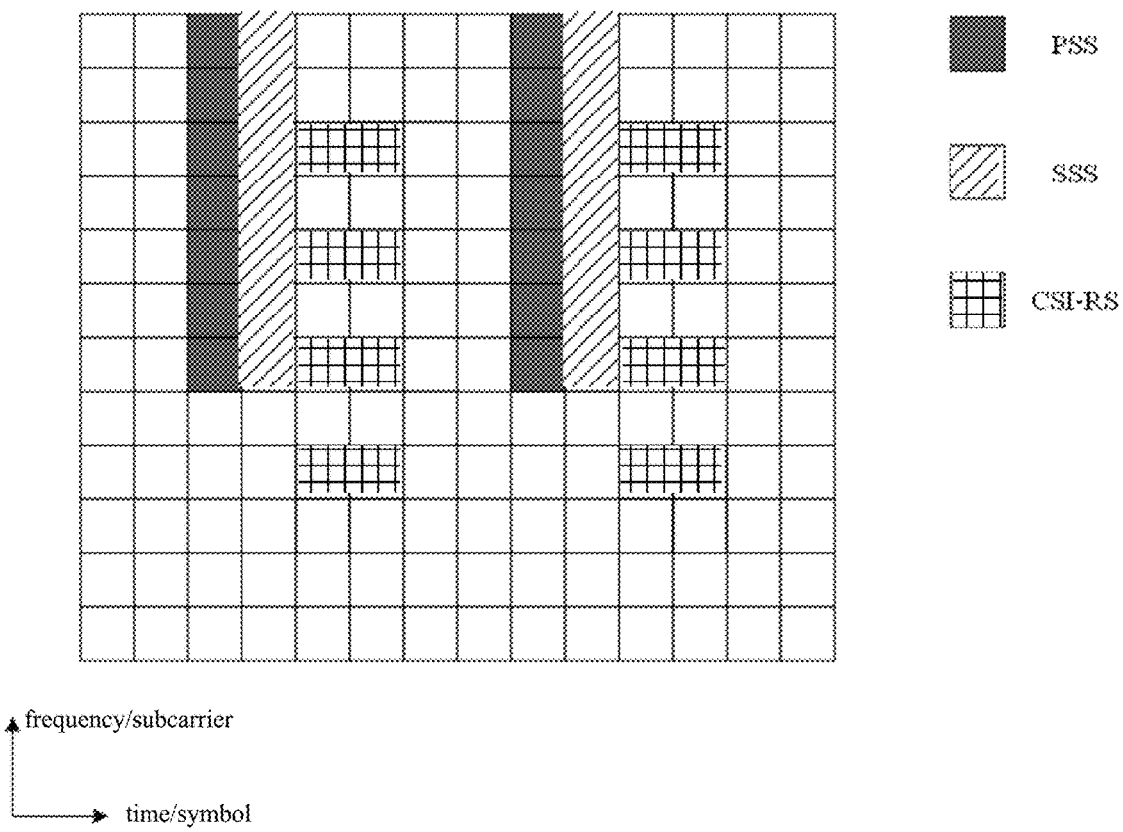

FIGS. 18 and 19 illustrate examples of time-frequency resources of respective signals in a DRS, however, the illustrated examples are merely illustrative and not limiting.

In the above exemplary embodiment, one subframe may include 1 or 2 DRS blocks. Furthermore, DRS blocks within one subframe may be defined to constitute one DRS burst. However, the number of DRS blocks included in a DRS burst is not limited thereto.

According to an embodiment, the generating unit 111 may be configured to generate a DRS burst composed of a predetermined number of DRS blocks, where the predetermined number may be determined according to an operation frequency point.

More specifically, for example, for an operation frequency point in frequency band less than 3 GHz, each DRS burst may contain up to 4 DRS blocks; for an operation frequency point in a frequency band greater than 3 GHz and less than 6 GHz, each DRS burst may contain up to 8 DRS blocks; for an operation frequency band in a frequency band greater than 6 GHz and less than 52.6 GHz, each DRS burst may contain up to 64 DRS blocks.

Figure 2:
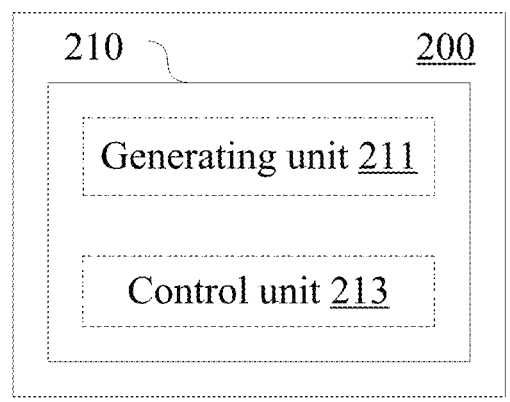
FIG. 2 is a block diagram showing a configuration example of an electronic device for wireless communication according to another embodiment of the present disclosure.

Further, according to an embodiment, the generated DRS may be transmitted with different subcarrier spacings. As shown in FIG. 2, an electronic device 200 for wireless communication according to the present embodiment includes a processing circuitry 210. The processing circuitry 210 includes a generating unit 211 and a control unit 213. The configuration of the generating unit 211 is similar to the generating unit 111 illustrated above with reference to FIG. 1, and a repeated description thereof is omitted here.

The control unit 213 is configured to control to transmit the DRS generated by the generating unit 211 with a subcarrier spacing shorter than a subcarrier spacing corresponding to 15 kHz.

As an example, the control unit 213 may be configured to control to transmit the DRS with a subcarrier spacing corresponding to 120 kHz, 240 kHz, or 480 kHz.

The DMTC length in LTE-LAA is fixed to 6 ms, and the DMTC length is one of the basic configuration information of a LAA secondary cell notified to a user by a primary cell radio resource control (RRC) signaling of a base station. In the NR-LAA, for example, due to a scenario setting combining multiple beams, the minimum DMTC window that can support up to 64 DRS block transmissions on a high frequency point band also needs 32 ms, that is, each subframe contains 2 DRS blocks. Based on above considerations, the window size of DMTC needs to be extended to be at least not less than 32 ms. The minimum value N of DMTC is closely related to the number n of DRS blocks included in one subframe, that is, $N \geq 64/n$ (in a high frequency point band scenario) is met. The above is a calculation result of the DMTC window length based on a subcarrier spacing (SCS) of 15 kHz in the system. It can be seen that for a high frequency point scenario, its corresponding DMTC window is extended to as much as 5 times the original, which greatly increases the occupation time of an unlicensed band channel, and there is a possibility that the principle of fair occupancy of a wireless channel is violated. Therefore, in order to ensure the fairness of channel occupation of a DRS transmission, an SCS greater than 15 kHz may be used to ensure that a DMTC window period does not exceed 10 ms, for example.

Therefore, in this embodiment, an SCS such as 120 kHz (the DMTC window is 8 ms), 240 kHz (the DMTC window is 4 ms) and 480 kHz (the DMTC window is 2 ms) can be supported.

By means of the above embodiments, it helps to avoid occupying an excessive time by an unlicensed band channel, thereby ensuring a fair occupation of the wireless channel.

Next, an electronic device for wireless communication according to another embodiment of the present disclosure will be illustrated. Since it is similar to the structure of the embodiment illustrated above with reference to FIG. 2, the electronic device of the present embodiment will also be illustrated with reference to FIG. 2. However, it should be noted that the electronic device according to the present embodiment can be implemented independently of the above embodiments.

The electronic device 200 for wireless communication according to the present embodiment includes a processing circuitry 210. The processing circuitry 210 includes a generating unit 211 and a control unit 213. The configuration of the generating unit 211 is similar to the generating unit 111 illustrated above with reference to FIG. 1.

The control unit 213 is configured to, when DRSs to be transmitted cannot be completely transmitted within a currently configured DMTC window period, control to transmit the DRS using an extended DMTC window.

In the existing LAA, a limitation with regard to DMTC is that the window size is fixed and unadjustable. This is acceptable for an original DRS signal with a length of 12 OFDM symbols. According to the existing manner, if a DRS transmission time length is not reached but the base station successfully detects that the channel is idle and accesses the channel, the current window period is automatically missed, and the DRS signal is not transmitted. However, for the case where one subframe contains multiple DRS signals (for example, each DRS may represent a different beam direction), a certain too late window access which causes a DRS transmission to be discarded may bring a greater performance degradation to the entire system.

Based on above considerations, the purpose of the present embodiment is to ensure that each DMTC window has a complete DRS signal transmission as much as possible, rather than discarding half or more of the DRS signals. To this end, an extendable DMTC window for a DRS transmission is proposed. The extendable DMTC window may be applied to both a DRS transmission on the base station side and a DRS reception on the user side.

Figure 14:
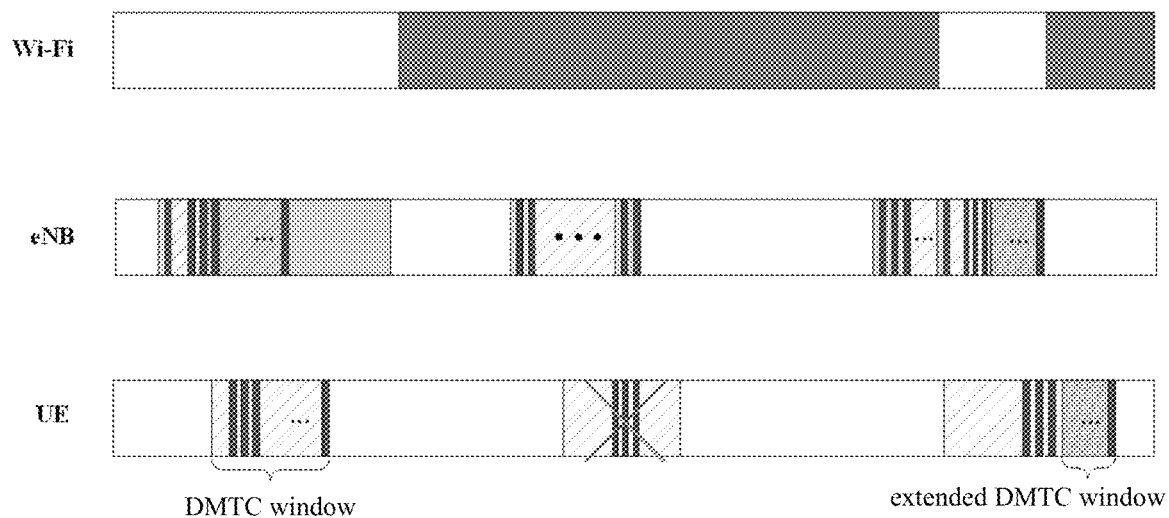
FIG. 14 is a schematic diagram for illustrating an expanded discovery measurement timing configuration window according to an embodiment of the present disclosure.

As shown in FIG. 14, an extended DMTC may be initiated by the base station side. Specifically, when the base station finds that DRSs which need to be transmitted cannot be completely transmitted within a currently configured DMTC window period, the DMTC window may be automatically extended to complete a DRS transmission.

On the user side, when DRSs are not completely received within a specified DMTC window period, the DMTC window may be automatically extended to ensure a complete reception of DRSs as much as possible. If a reception of all DRSs still cannot be finished within the extended DMTC window (for example, the extended upper limit may be set to a specified DMTC window length) period, the user may keep this DRS reception data and try to merge with the next received DRS and count together to complete the downlink synchronization and the channel quality measurement. The advantage of using this manner is that there is no overhead of additional control signaling, the base station and the user equipment (UE) may autonomously transmit and receive DRS signals under an established rule.

However, the embodiments are not limited to an autonomously extended DMTC window. For example, the user equipment may extend a DMTC window based on information from the base station. Accordingly, according to an embodiment, the control unit 213 may be configured to control to notify the user equipment of the size of the extended DMTC window by a licensed frequency band.

Next, an electronic device for wireless communication according to another embodiment of the present disclosure will be illustrated. Since it is similar to the structure of the embodiment illustrated above with reference to FIG. 2, the electronic device of the present embodiment will also be illustrated with reference to FIG. 2. However, it should be noted that the electronic device according to the present embodiment can be implemented independently of the above embodiments.

The electronic device 200 for wireless communication according to the present embodiment includes a processing circuitry 210. The processing circuitry 210 includes a generating unit 211 and a control unit 213. The configuration of the generating unit 211 is similar to the generating unit 111 illustrated above with reference to FIG. 1.

The control unit 213 is configured to control to transmit the DRS generated by the generating unit 211 by a target channel in the unlicensed band without performing an energy detection for the target channel.

In LTE-LAA, the DRS transmission is limited by a result of listen before talk (LBT). If the LBT detects that the current channel is busy, the DRS transmission opportunity (TxOP) in a certain DMTC window period may not be normally transmitted, which may cause DRSs in one or several DMTC window periods to be unable to be transmitted. This may reduce the synchronization efficiency of a NR-LAA system in the case where the unlicensed band environment is relatively crowded. Therefore, the present embodiment proposes a DRS transmission mode combining LBT and no LBT, so as to meet the requirement that NR-LAA needs more resources to transmit more reliable DRSs on an unlicensed band, for example.

Figure 15:
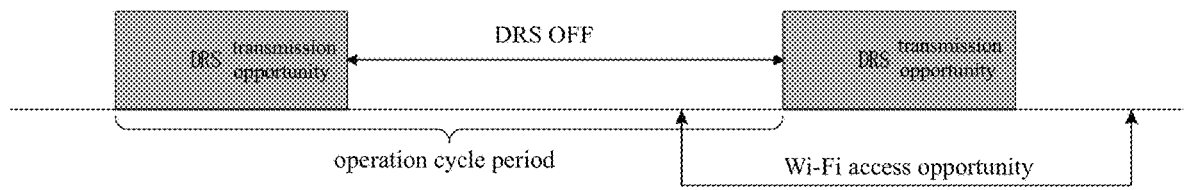
FIG. 15 is a schematic diagram for illustrating a DRS transmission without performing an energy detection for a target channel according to another embodiment of the present disclosure.

According to the present embodiment, the base station does not need to perform LBT before the first DRS transmission. The DRS transmission procedure without LBT may be configured to meet the channel fair occupancy scheme shown in FIG. 15. Specifically, the NR system may periodically occupy an unlicensed band channel, and select a suitable duty cycle to transmit information such as a DRS and a PDSCH (physical downlink shared channel)/PDCCH (physical downlink control channel). When performing a LRS transmission without LBT, for example, a threshold may be set for the number of DRS transmission failures, or a fast feedback relating to a DRS reception status fed back by the user on a licensed frequency band may be obtained. If the number of DRS transmission failures exceeds the set threshold, or the base station successively receives NACK (Negative Acknowledge) messages about DRS reception fed back by the user on a licensed frequency band, a LBT-based DRS transmission procedure may be triggered, that is, the DRS transmission during a period of time afterwards needs to be based on a detection result of LBT. In addition, the DMTC window of DRS based on LBT-free need not to be extendable, as long as once polling of DRS transmissions within one DMTC window period (e.g., DRSs for each beam direction) is guaranteed.

Accordingly, according to an embodiment, the control unit 213 may be further configured to control to receive feedback information relating to a reception status of the DRS from a user equipment.

Further, the control unit 213 may be further configured to control, according to the feedback information, to switch between a DRS transmission mode without performing an energy detection and a DRS transmission mode with an energy detection.

Next, an electronic device for wireless communication according to another embodiment of the present disclosure will be illustrated. Since it is similar to the structure of the embodiment illustrated above with reference to FIG. 2, the electronic device of the present embodiment will also be illustrated with reference to FIG. 2. However, it should be noted that the electronic device according to the present embodiment can be implemented independently of the above embodiments.

The electronic device 200 for wireless communication according to the present embodiment includes a processing circuitry 210. The processing circuitry 210 includes a generating unit 211 and a control unit 213. The configuration of the generating unit 211 is similar to the generating unit 111 illustrated above with reference to FIG. 1. In particular, in the present embodiment, the DRS block generated by the generating unit 211 may contain information related to a transmit beam index.

The control unit 213 is configured to control to respectively transmit the DRS blocks generated by the generating unit 211 for different beam directions.

For example, the beam index information may be included in the PSS or/and SSS or may be included in the CSI-RS.

In the present embodiment, for example, for the characteristic that the NR system operates in a high frequency point band, the index information of beams is included in each DRS block, and different beams have different indexes, which means that several DRS blocks in the same subframe may indicate information for different beams.

In addition, NR-LAA may still remain the original LBT-based DRS transmission. Considering the characteristic that the NR system adopts a multi-beam transmission, whether or not the DRS in each beam direction at each time can be transmitted cannot be definitely guaranteed due to being subject to LBT, the system delay and reliability will be lower than the system performance of the LTE-LAA system.

To this end, according to an embodiment of the present disclosure, an integrated channel detection manner that combines an omnidirectional Clear Channel Assessment (CCA) and a directional CCA is provided to determine an interference-free beam direction in which a DRSs can be transmitted.

According to an embodiment, the control unit 213 may be configured to control to transmit the DRS based on an omnidirectional channel energy detection, transmit the DRS based on a directional channel energy detection, or transmit the DRS based on a combination of the omnidirectional channel energy detection and the directional channel energy detection.

More specifically, a manner of the combination of the omnidirectional channel energy detection and the directional channel energy detection may include: performing the omnidirectional channel energy detection, and directionally transmitting the DRS if it is detected that a target channel is idle; if the omnidirectional channel energy detection indicates that the target channel is non-idle, performing the directional channel energy detection, directionally transmitting the DRS for a direction detected as being idle, and not transmitting the DRS for a direction detected as being non-idle.

Figure 16:
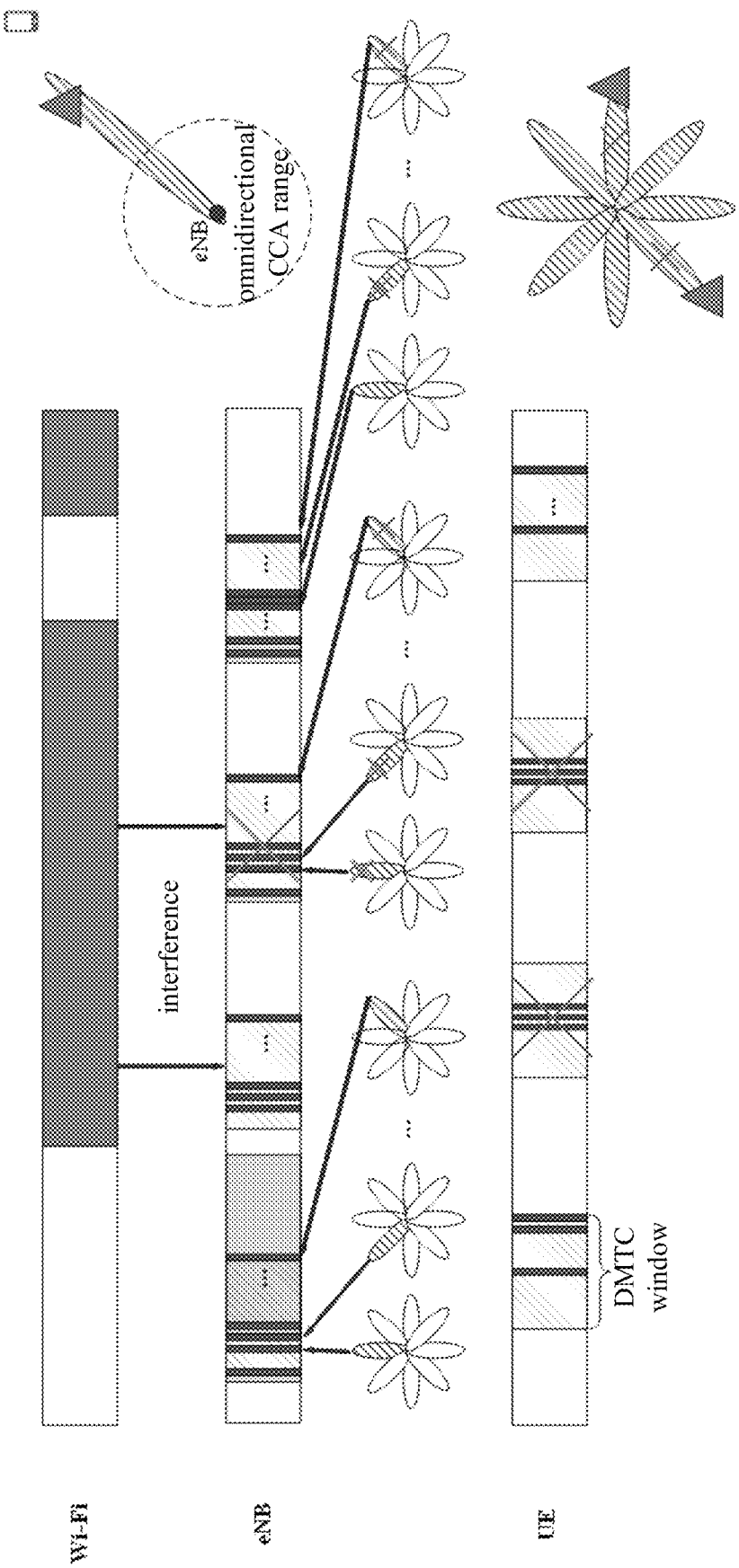
FIG. 16 is a schematic diagram for illustrating a DRS transmission for different beam directions according to yet another embodiment of the present disclosure.

This procedure will be illustrated in more detail with reference to FIG. 16. As shown by the dotted circle on the right side of FIG. 16, a conventional CCA is based on an omnidirectional energy detection of the antenna. If the NR system operating in the high frequency point band uses the omnidirectional CCA detection, the base station may not be able to detect the Wi-Fi access point interference indicated by the triangle in the figure due to a larger scale path fading in the environment, and thus missed detection may occur. For the NR-LAA users, the result of missed detection may be such that users in the direction in which the interference is located cannot correctly implement the downlink DRS reception, and may also interfere with the transmission of Wi-Fi or other resource occupancy technology operating in this beam direction.

According to the present embodiment, by using a DRS transmission mode based on CCA detection of beams, the DRS can only be transmitted in the direction in which the channel is detected to be idle, thereby facilitating to ensure the fairness of channel occupation.

Figure 17:
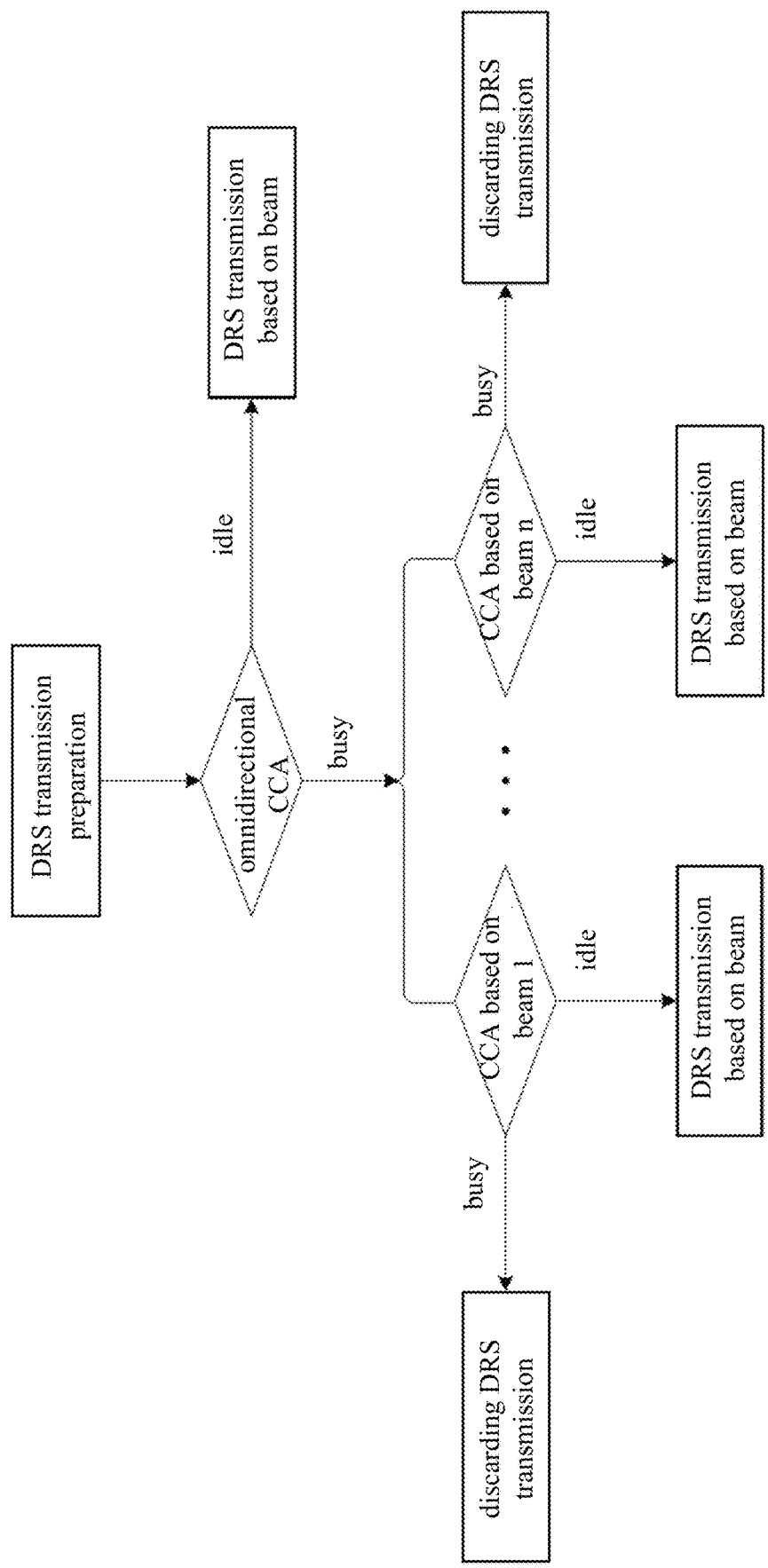
FIG. 17 is a flowchart for illustrating an procedure example of a DRS transmission for different beam directions according to an embodiment of the present disclosure.

A procedure example using the manner of combination of an omnidirectional channel energy detection and a directional energy detection as a channel detection before a DRS transmission will be illustrated with reference to FIG. 17. As the first DRS transmission, the base station first performs an omnidirectional CCA, and if the channel is detected to be idle, then directionally transmit the DRS (this procedure may include DRS transmission failures in some directions). On the other hand, if an energy detection value of the omnidirectional CCA is greater than the set threshold (i.e., the channel is busy), the CCA in specific directions, that is, the CCA based on beam 1 to the CCA based on beam n in the figure, are performed. For each beam, the DRS of the corresponding beam is transmitted only when it is detected to be idle. If the detection result of a channel is busy, the DRS transmission in the corresponding beam direction within this DMTC window is discarded.

Next, an electronic device for wireless communication according to another embodiment of the present disclosure will be illustrated. Since it is similar to the structure of the embodiment illustrated above with reference to FIG. 2, the electronic device of the present embodiment will also be illustrated with reference to FIG. 2. However, it should be noted that the electronic device according to the present embodiment can be implemented independently of the above embodiments.

The electronic device 200 for wireless communication according to the present embodiment includes a processing circuitry 210. The processing circuitry 210 includes a generating unit 211 and a control unit 213. The configuration of the generating unit 211 is similar to the generating unit 111 illustrated above with reference to FIG. 1

The control unit 213 is configured to control to transmit the DRS generated by the generating unit 211 with a discovery measurement timing configuration DMTC period less than 40 ms.

However, it should be noted that embodiments of the present disclosure are not limited thereto. For example, a period of the DMTC may be 10 ms-200 ms, for example, may be 10 ms, 20 ms, 40 ms, 80 ms, 160 ms, or the like. In addition, a window size of the DMTC may be, for example, 6 ms-40 ms, for example, 6 ms, 10 ms, or the like. In addition, various combinations of the DMTC period and the DMTC window size may be used as long as the DMTC period is greater than the configured corresponding DMTC window size.

Next, an electronic device for wireless communication according to further some embodiments of the present disclosure will still be illustrated with reference to FIG. 2, without repeating some of the details that have been described above. It should be noted that the electronic device according to the following embodiments can be implemented independently of the above embodiments.

According to an embodiment, an electronic device 200 for wireless communication includes a processing circuitry 210. The processing circuitry 210 includes a generating unit 211 and a control unit 213.

The generating unit 211 is configured to generate a DRS for an unlicensed band.

The control unit 213 is configured to control to transmit the DRS with a shorter subcarrier spacing than a subcarrier spacing corresponding to 15 kHz.

According to another embodiment, an electronic device 200 for wireless communication includes a processing circuitry 210. The processing circuitry 210 includes a generating unit 211 and a control unit 213.

The generating unit 211 is configured to generate a DRS for an unlicensed band.

The control unit 213 is configured to, when DRSs to be transmitted cannot be completely transmitted within a currently configured DMTC window period, control to transmit the DRS using an extended DMTC window.

According to yet another embodiment, an electronic device 200 for wireless communication includes a processing circuitry 210. The processing circuitry 210 includes a generating unit 211 and a control unit 213.

The generating unit 211 is configured to generate a DRS for the unlicensed band.

The control unit 213 is configured to control to transmit the DRS by a target channel in the unlicensed band without performing an energy detection for the target channel.

According to still another embodiment, an electronic device 200 for wireless communication includes a processing circuitry 210. The processing circuitry 210 includes a generating unit 211 and a control unit 213.

The generating unit 211 is configured to generate a DRS for the unlicensed band.

The control unit 213 is configured to control to transmit the DRS based on a combination of an omnidirectional channel energy detection and a directional channel energy detection.

The manner of the combination of an omnidirectional channel energy detection and a directional channel energy detection includes: performing the omnidirectional channel energy detection, and directionally transmitting the DRS if it is detected that a target channel is idle; if the omnidirectional channel energy detection indicates that the target channel is non-idle, performing directional channel energy detection, directionally transmitting the DRS for a direction detected as being idle, and not transmitting the DRS for a direction detected as being non-idle.

Figure 8:
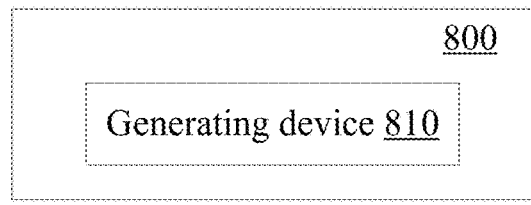
FIG. 8 is a block diagram showing a configuration example of a wireless communication device according to an embodiment of the present disclosure.

Further, as shown in FIG. 8, a wireless communication device 800 according to an embodiment of the present disclosure includes a generating device 810 configured to generate a DRS for an unlicensed band, the DRS contains a PSS, an SSS, and a CSI-RS.

Figure 9:
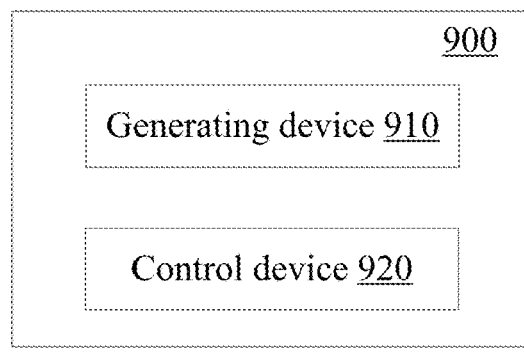
FIG. 9 is a block diagram showing a configuration example of a wireless communication device according to another embodiment of the present disclosure.

Further, as shown in FIG. 9, a wireless communication device 900 according to an embodiment of the present disclosure includes a generating device 910 and a control device 920. The generating device 910 is configured to generate a DRS for the unlicensed band. The control device 920 may have a similar configuration to the control unit 213 in the above various embodiments.

In addition, the wireless communication device according to an embodiment of the present disclosure may include a transceiver device and the electronic device according to the above embodiments. The electronic device may control the transceiver device to perform transmission and reception of DRS and/or related signals, and the like.

In addition, it should be noted that the electronic device and the wireless communication device according to embodiments of the present disclosure may be implemented not only on the base station side but also on the user equipment side.

The electronic device on the user side, for example, may be configured to control to receive a DRS for an unlicensed band, where the DRS contains a PSS, an SSS, and a CSI-RS.

Further, for example, correspondingly to the above embodiments, the electronic device on the user side may be configured to control to receive information about a size of the extended DMTC window by a licensed frequency band.

Further, for example, correspondingly to the above embodiments, the electronic device on the user side may be configured to control to transmit feedback information relating to reception status of the DRS to the base station.

According to another embodiment, an electronic device for wireless communication is provided that includes a processing circuitry. The processing circuitry is configured to generate a discovery reference signal DRS for an unlicensed band. The DRS contains a primary synchronization signal PSS, a secondary synchronization signal SSS and a physical broadcast channel demodulation reference signal PBCH-DMRS.

Optionally, the DRS may further contain a channel state information reference signal CSI-RS.

Figure 20:
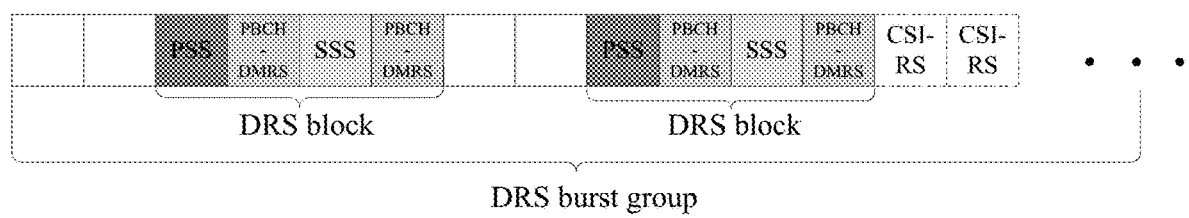
FIG. 20 is a schematic diagram for illustrating an example structure of a DRS according to another embodiment of the present disclosure.

FIG. 20 illustrates an example of a DRS configuration according to an embodiment of the present disclosure. As shown in FIG. 20, a new DRS block is composed of a PSS, an SSS, and a PBCH-DMRS. The function of NR PBCH-DMRS is to assist in decoding the PBCH, while the SSS and PBCH-DMRS are also used for measurement of SS/PBCH RSRP. The PSS, SSS and PBCH-DMRS can realize a full functionality of the traditional DRS.

Furthermore, whether or not to configure the CSI-RS may be determined, for example, by the base station according to a specific implementation.

It should be noted that although an example of arrangement order of symbols in a DRS block is given in FIG. 20, the DRS structure according to an embodiment of the present disclosure is not limited to the illustrated example.

In the illustrated example, the number of symbols constituting a DRS block is 4, although in other embodiments, the number of symbols constituting a DRS block may be more than 4.

As shown in the above example, according to an embodiment, the PSS, SSS and PBCH-DMRS constituting one DRS block may occupy successive OFDM symbols.

Preferably, the PSS, SSS and PBCH-DMRS in the same DRS block may be arranged in the same time slot to thereby further facilitating detection by a user. However, embodiments of the present disclosure are not limited thereto. For example, the PSS, SSS and PBCH-DMRS in a DRS block may also be inconsecutive (i.e., occupying inconsecutive OFDM symbols in time domain), and may not be arranged in one time slot.

Further, the PSS, SSS and PBCH-DMRS in a DRS block may have various arrangement orders. For example, the signal arrangement orders in a DRS block may include:

PSS, SSS, PBCH-DMRS, PBCH-DMRS;
PSS, PBCH-DMRS, SSS, PBCH-DMRS;
PBCH-DMRS, PSS, SSS, PBCH-DMRS;
PSS, PBCH-DMRS, PBCH-DMRS, SSS;
PBCH-DMRS, PSS, PBCH-DMRS, SSS;
PBCH-DMRS, PBCH-DMRS, PSS, SSS;
SSS, PSS, PBCH-DMRS, PBCH-DMRS;
SSS, PBCH-DMRS, PSS, PBCH-DMRS;
PBCH-DMRS, SSS, PSS, PBCH-DMRS;
SSS, PBCH-DMRS, PBCH-DMRS, PSS;
PBCH-DMRS, SSS, PBCH-DMRS, PSS; or
PBCH-DMRS, PBCH-DMRS, SSS, PSS.

In the above description of an electronic device for wireless communication according to an embodiment of the present disclosure, apparently, some methods and procedures are also disclosed. Next, a description of a wireless communication method according to an embodiment of the present disclosure will be given without repeating the details that have been described above.

Figure 3:
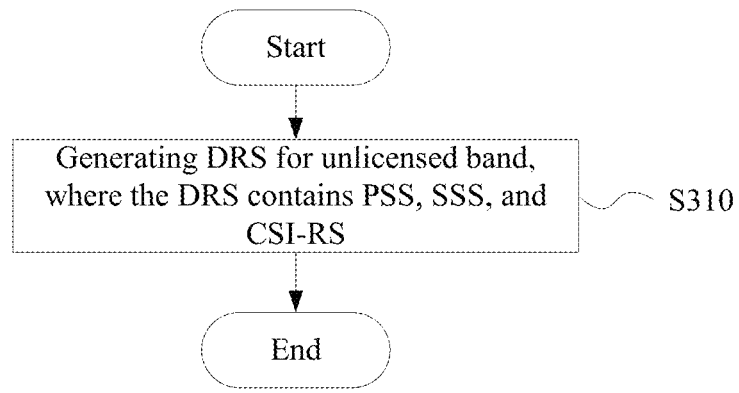
FIG. 3 is a flowchart showing a procedure example of a wireless communication method according to an embodiment of the present disclosure.

As shown in FIG. 3, a wireless communication method according to an embodiment includes:

S310, generating a discovery reference signal DRS for an unlicensed band, where the DRS contains a PSS, an SSS, and a CSI-RS.

Figure 4:
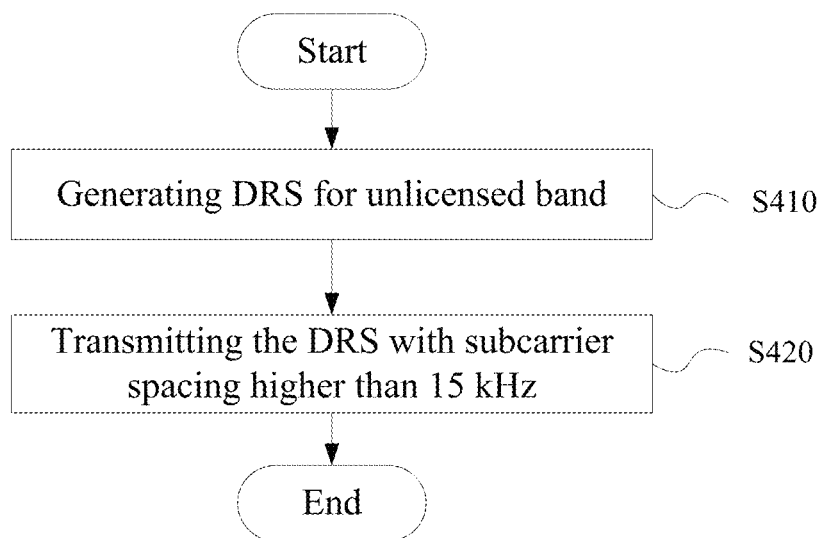
FIG. 4 is a flowchart showing a procedure example of a wireless communication method according to another embodiment of the present disclosure.

As shown in FIG. 4, a wireless communication method according to another embodiment includes:

S410, generating a DRS for an unlicensed band; and
S420, transmitting the DRS with a subcarrier spacing higher than 15 kHz.

Figure 5:
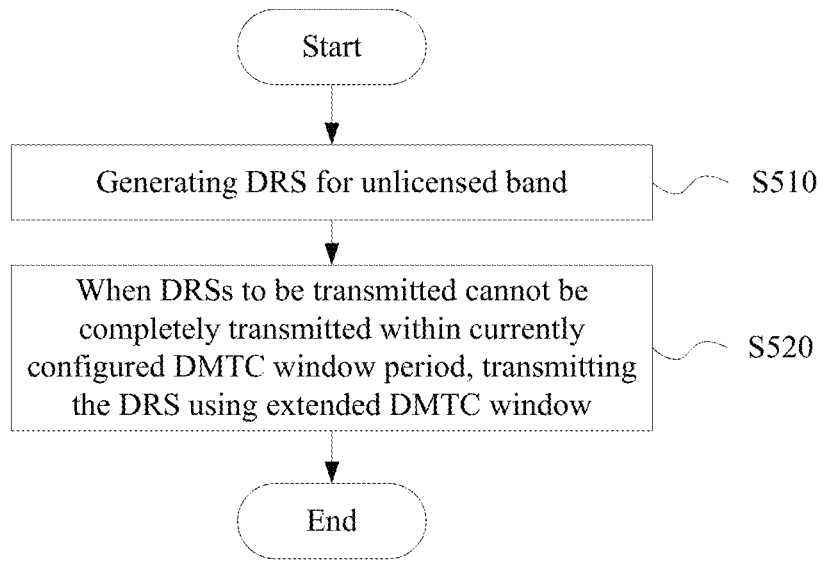
FIG. 5 is a flowchart showing a procedure example of a wireless communication method according to yet another embodiment of the present disclosure.

As shown in FIG. 5, a wireless communication method according to yet another embodiment includes:

S510, generating a DRS for an unlicensed band; and
S520, when DRSs to be transmitted cannot be completely transmitted within a currently configured DMTC window period, transmitting the DRS using an extended DMTC window.

Figure 6:
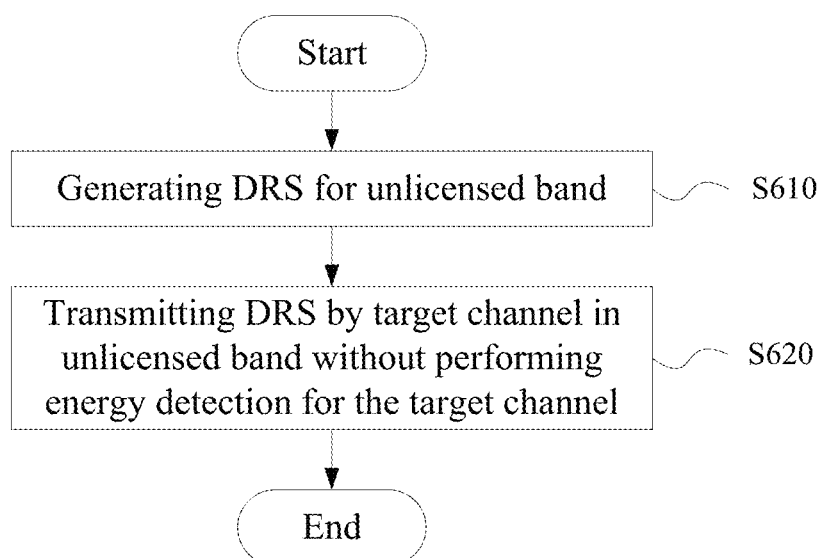
FIG. 6 is a flowchart showing a procedure example of a wireless communication method according to still another embodiment of the present disclosure.

As shown in FIG. 6, a wireless communication method according to still another embodiment includes:

S610, generating a DRS for an unlicensed band; and
S620, transmitting the DRS by a target channel in the unlicensed band without performing an energy detection for the target channel.

Figure 7:
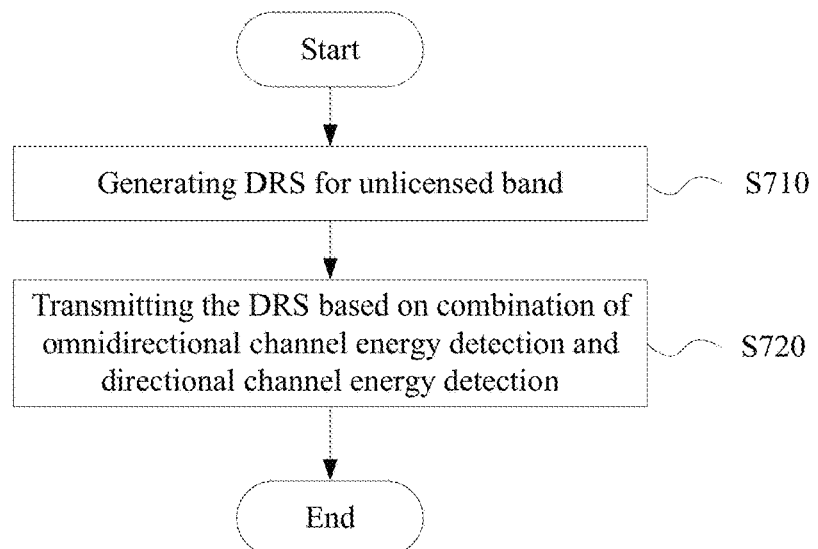
FIG. 7 is a flowchart showing a procedure example of a wireless communication method according to another embodiment of the present disclosure.

As shown in FIG. 7, a wireless communication method according to another embodiment includes:

S710, generating a DRS for an unlicensed band; and
S720, transmitting the DRS based on a combination of an omnidirectional channel energy detection and a directional channel energy detection.

a manner of the combination of an omnidirectional channel energy detection and a directional channel energy detection includes:

performing the omnidirectional channel energy detection, and directionally transmitting the DRS if it is detected that a target channel is idle;

if the omnidirectional channel energy detection indicates that the target channel is non-idle, performing the directional channel energy detection, directionally transmitting the DRS for a direction detected as being idle, and not transmitting the DRS for a direction detected as being non-idle.

A wireless communication method according to another embodiment includes: generating a discovery reference signal DRS for an unlicensed band. The DRS contains a primary synchronization signal PSS, a secondary synchronization signal SSS and a physical broadcast channel demodulation reference signal PBCH-DMRS. Optionally, the DRS may further contain a channel state information reference signal CSI-RS.

In addition, the embodiments of the present disclosure further includes a computer readable medium which includes executable instructions that, when executed by an information processing device, cause the information processing device to implement the method described above.

By way of example, various steps of the above methods as well as various constituent modules and/or units of the above device may be implemented as a software, a firmware, a hardware or a combination thereof. In the case of being implemented by the software or the firmware, a program constituting the software for implementing the above method may be installed from a storage medium or a network to a computer having a dedicated hardware structure (for example, the general-purpose computer 1000 shown in FIG. 10), This computer, when is installed various programs thereon, can perform various functions and the like.

Figure 10:
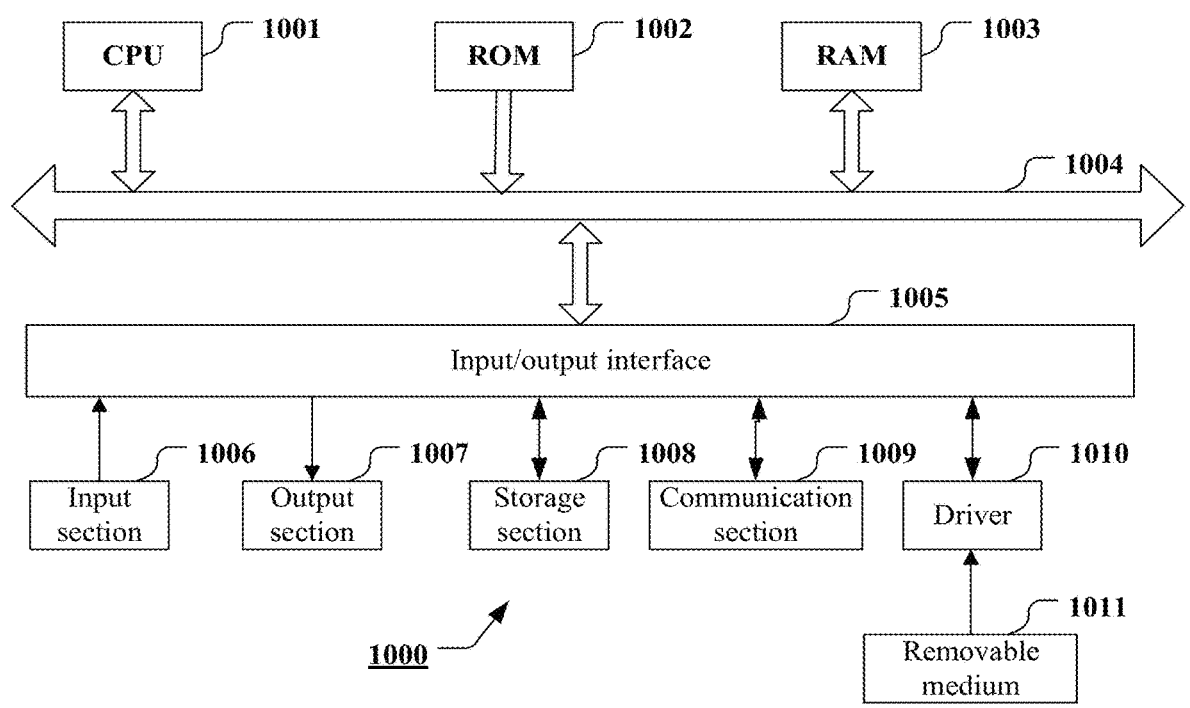
FIG. 10 is a block diagram showing an exemplary structure of a computer that implements method and device according to the present disclosure.

In FIG. 10, a central processing unit (i.e., CPU) 1001 executes various processes in accordance with a program stored in a read only memory (ROM) 1002 or a program loaded from a storage section 1008 to a random access memory (RAM) 1003. In the RAM 1003, data required when the CPU 1001 executes various processes and the like is also stored as needed. The CPU 1001, the ROM 1002, and the RAM 1003 are linked to each other via a bus 1004. An input/output interface 1005 is also linked to the bus 1004.

The following components are linked to the input/output interface 1005: an input section 1006 (including a keyboard, a mouse, etc.), an output section 1007 (including a display such as a cathode ray tube (CRT), a liquid crystal display (LCD) and the like, and a speaker and the like), a storage section 1008 (including a hard disk or the like), a communication section 1009 (including a network interface card such as a LAN card, a modem or the like). The communication section 1009 performs communication processing via a network such as the Internet. A driver 1010 can also be linked to the input/output interface 1005 as needed. A removable medium 1011 such as a magnetic disk, an optical disk, a magneto-optical disk, a semiconductor memory or the like is mounted on the drive 1010 as needed, so that the computer program read therefrom is installed into the storage section 1008 as needed.

In the case where the above series of processing is implemented by a software, a program constituting the software is installed from a network such as the Internet or a storage medium such as the removable medium 1011.

It will be understood by those skilled in the art that such a storage medium is not limited to the removable medium 1011 shown in FIG. 10 in which a program is stored and which distributes separately from the device to provide the program to the user. Examples of the removable medium 1011 include a magnetic disk (including a floppy disk (registered trademark)), an optical disk (including a compact disk read only memory (CD-ROM) and a digital versatile disk (DVD)), and a magneto-optical disk (including a mini-disk (MD) (registered trademark)) and a semiconductor memory. Alternatively, the storage medium may be the ROM 1002, a hard disk included in the storage section 1008 or the like, in which a programs is stored, and distributed to the user together with the device containing them.

Embodiments of the present disclosure also relate to a program product in which a machine readable instruction code is stored. When the instruction code is read and executed by a machine, the above method according to an embodiment of the present disclosure can be performed.

Accordingly, a storage medium for carrying the above program product in which the machine readable instruction code is stored is also included in the disclosure of the present disclosure. The storage medium includes, but is not limited to, a floppy disk, an optical disk, a magneto-optical disk, a memory card, a memory stick, and the like.

Embodiments of the present application also relate to the following electronic device. In the case where the electronic device is used on the base station side, the electronic device may be realized as any type of gNB, evolved Node B (eNB), such as a macro eNB and a small eNB. The small eNB may be an eNB such as a pico eNB, a micro eNB, and a home (femto) eNB that covers a cell smaller than a macro cell. Instead, the electronic device may be realized as any other types of base stations such as a NodeB and a base transceiver station (BTS). The electronic device may include a main body (that is also referred to as a base station device) configured to control wireless communication, and one or more remote radio heads (RRH) disposed in a different place from the main body. In addition, various types of terminals, which will be described below, may each operate as the base station by temporarily or semi-persistently executing a base station function.

In the case where the electronic device is used on the user equipment side, it may be realized as a mobile terminal (such as a smartphone, a tablet personal computer (PC), a notebook PC, a portable game terminal, a portable/dongle type mobile router, and a digital camera), or an in-vehicle terminal (such as a car navigation apparatus). Furthermore, the electronic device may be a wireless communication module (such as an integrated circuit module including a single or multiple die) mounted on each of the terminals.

Application Examples Regarding a Terminal Device

Figure 11:
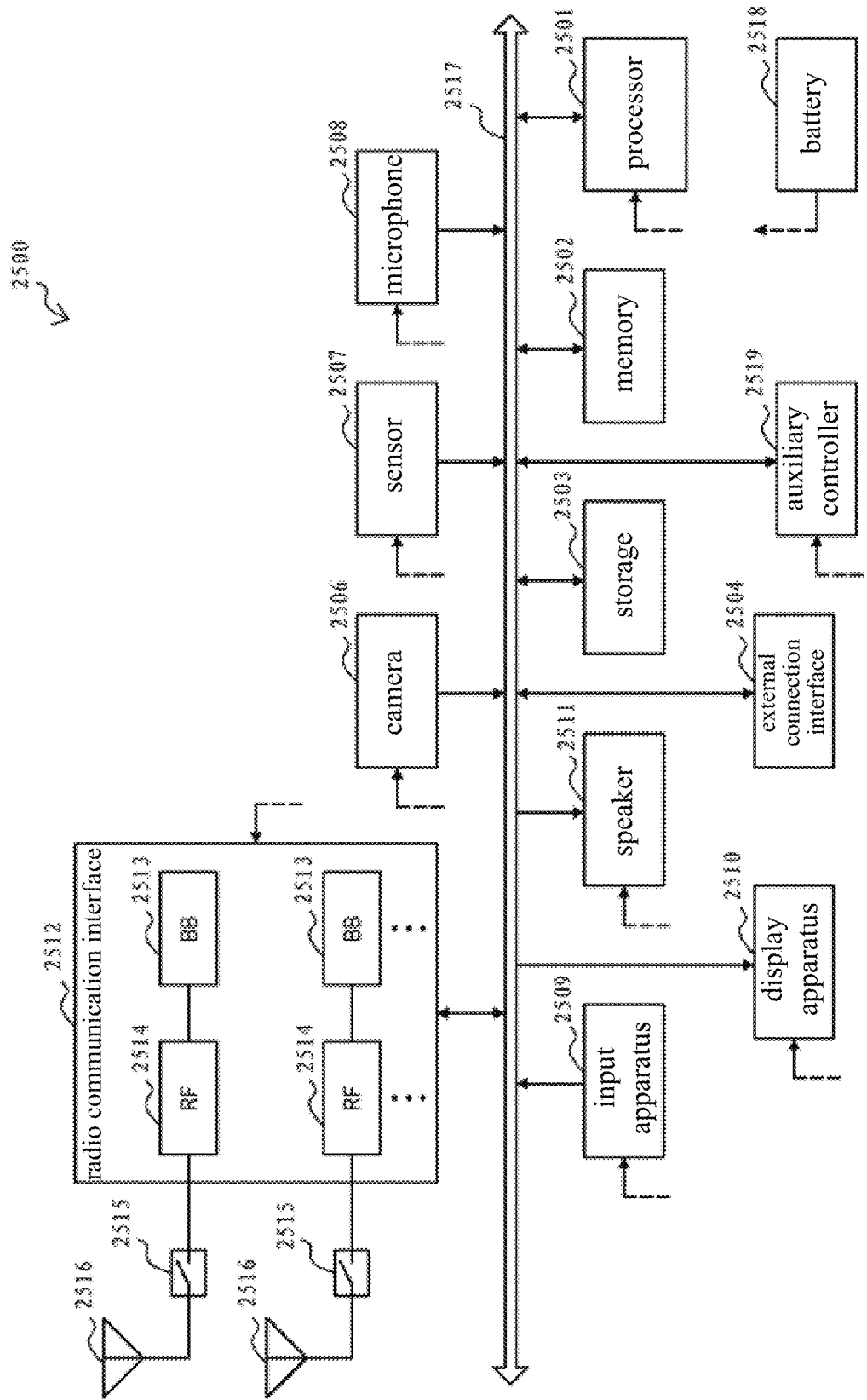
FIG. 11 is a block diagram showing an example of a schematic configuration of a smartphone to which the technology of the present disclosure may be applied.

FIG. 11 is a block diagram illustrating an example of a schematic configuration of a smartphone 2500 to which the technology of the present disclosure may be applied. The smartphone 2500 includes a processor 2501, a memory 2502, a storage 2503, an external connection interface 2504, a camera 2506, a sensor 2507, a microphone 2508, an input apparatus 2509, a display apparatus 2510, a speaker 2511, a radio communication interface 2512, one or more antenna switches 2515, one or more antennas 2516, a bus 2517, a battery 2518, and an auxiliary controller 2519.

The processor 2501 may be, for example, a CPU or a system on a chip (SoC), and controls functions of an application layer and another layer of the smartphone 2500. The memory 2502 includes RAM and ROM, and stores a program that is executed by the processor 2501, and data. The storage 2503 may include a storage medium such as a semiconductor memory and a hard disk. The external connection interface 2504 is an interface for connecting an external device (such as a memory card and a universal serial bus (USB) device) to the smartphone 900.

The camera 2506 includes an image sensor (such as a charge coupled device (CCD) and a complementary metal oxide semiconductor (CMOS)), and generates a captured image. The sensor 2507 may include a group of sensors such as a measurement sensor, a gyro sensor, a geomagnetic sensor, and an acceleration sensor. The microphone 2508 converts sounds that are input to the smartphone 2500 to audio signals. The input apparatus 2509 includes, for example, a touch sensor configured to detect a touch on a screen of the display apparatus 2510, a keypad, a keyboard, a button, or a switch, and receives an operation or information input from a user. The display apparatus 2510 includes a screen (such as a liquid crystal display (LCD) and an organic light-emitting diode (OLED) display), and displays an output image of the smartphone 2500. The speaker 2511 converts audio signals that are output from the smartphone 2500 to sounds.

The radio communication interface 2512 supports any cellular communication scheme (such as LTE and LTE-Advanced), and performs wireless communication. The radio communication interface 2512 may typically include, for example, a baseband (BB) processor 2513 and a radio frequency (RF) circuit 2514. The BB processor 2513 may perform, for example, encoding/decoding, modulating/demodulating, and multiplexing/demultiplexing, and performs various types of signal processing for wireless communication. Meanwhile, the RF circuit 2514 may include, for example, a mixer, a filter, and an amplifier, and transmits and receives radio signals via the antenna 2516. The radio communication interface 2512 may be a one chip module having the BB processor 2513 and the RF circuit 2514 integrated thereon. The radio communication interface 2512 may include multiple BB processors 2513 and multiple RF circuits 2514, as illustrated in FIG. 11. Although FIG. 11 illustrates the example in which the radio communication interface 2512 includes multiple BB processors 2513 and multiple RF circuits 2514, the radio communication interface 2512 may also include a single BB processor 2513 or a single RF circuit 2514.

Furthermore, in addition to the cellular communication scheme, the radio communication interface 2512 may support another type of wireless communication scheme such as a short-distance wireless communication scheme, a near field communication scheme, and a radio local area network (LAN) scheme. In that case, the radio communication interface 2512 may include the BB processor 2513 and the RF circuit 2514 for each wireless communication scheme.

Each of the antenna switches 2515 switches connection destinations of the antennas 2516 among multiple circuits (such as circuits for different wireless communication schemes) included in the radio communication interface 2512.

Each of the antennas 2516 includes a single or multiple antenna elements (such as multiple antenna elements included in an MIMO antenna), and is used for the radio communication interface 2512 to transmit and receive radio signals. The smartphone 2500 may include the multiple antennas 2516, as shown in FIG. 11. Although FIG. 11 illustrates the example in which the smartphone 2500 includes multiple antennas 2516, the smartphone 2500 may also include a single antenna 2516.

Furthermore, the smartphone 2500 may include the antenna 2516 for each wireless communication scheme. In that case, the antenna switches 2515 may be omitted from the configuration of the smartphone 2500.

The bus 2517 connects the processor 2501, the memory 2502, the storage 2503, the external connection interface 2504, the camera 2506, the sensor 2507, the microphone 2508, the input apparatus 2509, the display apparatus 2510, the speaker 2511, the radio communication interface 2512, and the auxiliary controller 2519 to each other. The battery 2518 supplies power to each block of the smartphone 2500 shown in FIG. 11 via feeder lines, which are partially shown as dashed lines in the figure. The auxiliary controller 2519 operates a minimum necessary function of the smartphone 2500, for example, in a sleep mode.

In the smartphone 2500 shown in FIG. 11, a transceiver device of the wireless communication device on the user equipment side according to an embodiment of the present disclosure may be implemented by the radio communication interface 2512. At least a part of functionality of the processing circuit and/or the respective units of the electronic device or the wireless communication device on the user equipment side according to an embodiment of the present disclosure may also be implemented by the processor 2501 or the auxiliary controller 2519. For example, the power consumption of the battery 2518 may be reduced by performing a part of functionality of the processor 2501 by the auxiliary controller 2519. Further, the processor 2501 or the auxiliary controller 2519 may execute at least a part of functionality of the processing circuit and/or the respective units of the electronic device or the wireless communication device on the user equipment side on the user equipment side according to the embodiment of the present disclosure by executing the program stored in the memory 2502 or the storage device 2503.

Application Examples Regarding a Base Station

Figure 12:
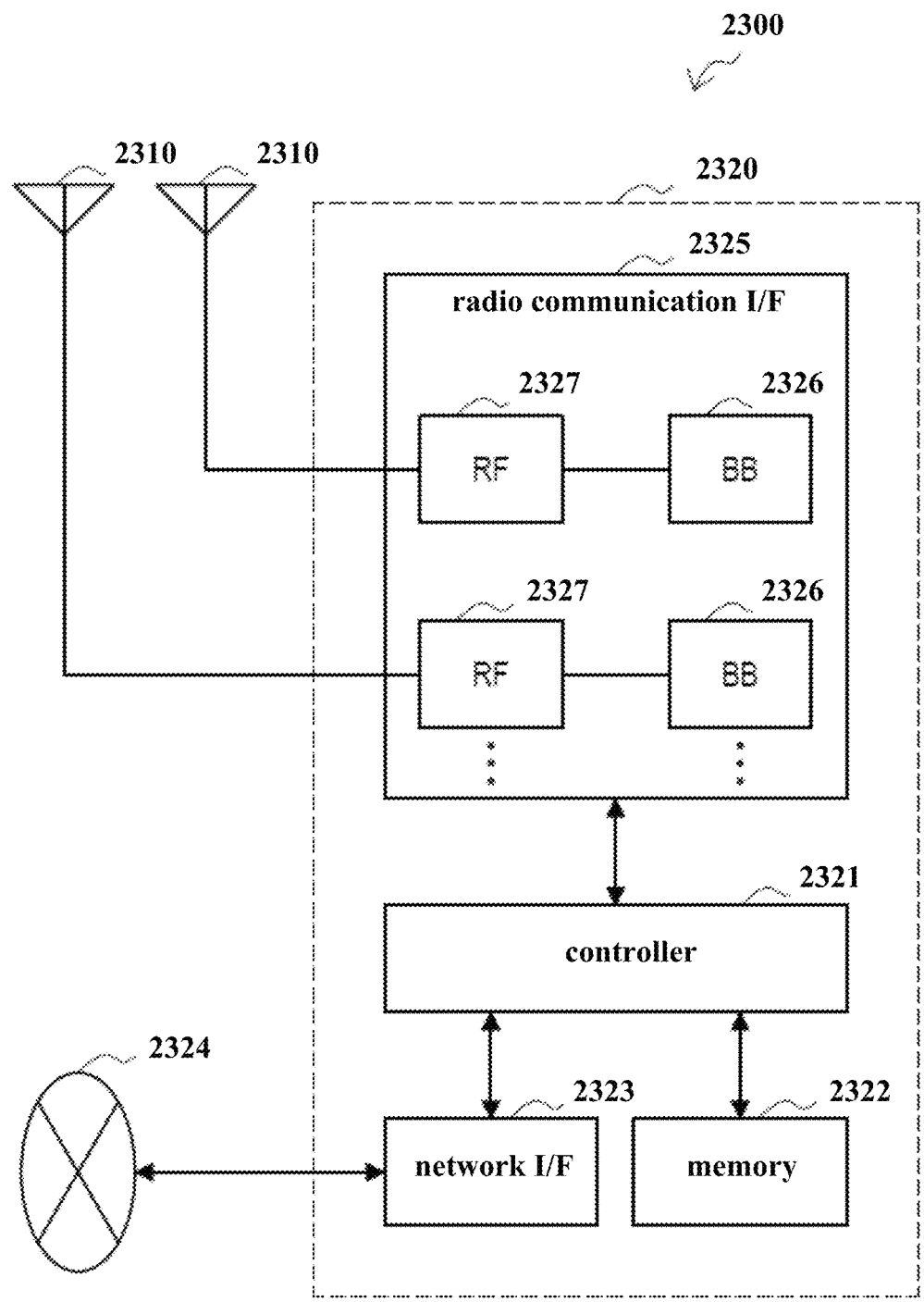
FIG. 12 is a block diagram showing an example of a schematic configuration of a gNB to which the technology of the present disclosure may be applied.

FIG. 12 is a block diagram illustrating an example of a schematic configuration of a gNB to which the technology of the present disclosure may be applied. A gNB 2300 includes one or more antennas 2310 and a base station device 2320. Each antenna 2310 and the base station device 2320 may be connected to each other via an radio frequency (RF) cable.

Each of the antennas 2310 includes a single or multiple antenna elements (such as multiple antenna elements included in a multiple input multiple output (MIMO) antenna), and is used for the base station device 2320 to transmit and receive radio signals. The gNB 2300 may include multiple antennas 2310, as illustrated in FIG. 12. For example, the multiple antennas 2310 may be compatible with multiple frequency bands used by the gNB 2300. Although FIG. 12 illustrates an example in which the gNB 2300 includes the multiple antennas 2310, the gNB 2300 may also include a single antenna 2310.

The base station device 2320 includes a controller 2321, a memory 2322, a network interface 2323, and a radio communication interface 2325.

The controller 2321 may be, for example, a CPU or a DSP, and operates various functions of a higher layer of the base station device 2320. For example, the controller 2321 generates a data packet from data in signals processed by the radio communication interface 2325, and transfers the generated packet via the network interface 2323. The controller 2321 may bundle data from multiple base band processors to generate the bundled packet, and transfer the generated bundled packet. The controller 2321 may have logical functions of performing control such as wireless resource control, wireless bearer control, mobility management, admission control, and a scheduling. The control may be performed in corporation with a gNB or a core network node in the vicinity. The memory 2322 includes RAM and ROM, and stores a program that is executed by the controller 2321, and various types of control data (such as a terminal list, transmission power data, and scheduling data).

The network interface 2323 is a communication interface for connecting the base station device 2320 to a core network 2324. The controller 2321 may communicate with a core network node or another gNB via the network interface 2323. In that case, the gNB 2300, and the core network node or the other gNB may be connected to each other through a logical interface (such as an S1 interface and an X2 interface). The network interface 2323 may also be a wired communication interface or a radio communication interface for wireless backhaul. If the network interface 2323 is a radio communication interface, the network interface 2323 may use a higher frequency band for wireless communication than a frequency band used by the radio communication interface 2325.

The radio communication interface 2325 supports any cellular communication scheme (such as Long Term Evolution (LTE) and LTE-Advanced), and provides wireless connection to a terminal positioned in a cell of the gNB 2300 via the antenna 2310. The radio communication interface 2325 may typically include, for example, a BB processor 2326 and an RF circuit 2327. The BB processor 2326 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 2326 may have a part or all of the above-described logical functions instead of the controller 2321. The BB processor 2326 may be a memory that stores a communication control program, or a module that includes a processor and a related circuit configured to execute the program. Updating the program may allow the functionality of the BB processor 2326 to be changed. The module may be a card or a blade that is inserted into a slot of the base station device 2320. Alternatively, the module may also be a chip that is mounted on the card or the blade. Meanwhile, the RF circuit 2327 may include, for example, a mixer, a filter, and an amplifier, and transmits and receives wireless signals via the antenna 2310.

The radio communication interface 2325 may include multiple BB processors 2326, as illustrated in FIG. 12. For example, the multiple BB processors 2326 may be compatible with multiple frequency bands used by the gNB 2300. The radio communication interface 2325 may include multiple RF circuits 2327, as illustrated in FIG. 12. For example, the multiple RF circuits 2327 may be compatible with multiple antenna elements. Although FIG. 12 illustrates the example in which the radio communication interface 2325 includes the multiple BB processors 2326 and the multiple RF circuits 2327, the radio communication interface 2325 may also include a single BB processor 2326 or a single RF circuit 2327.

In gNB 2300 shown in FIG. 12, the transceiver device of the wireless communication device on the base station side according to an embodiment of the present disclosure may be implemented by the radio communication interface 2325. At least a part of functionality of the processing circuit and/or the respective units of the electronic device or the wireless communication device on the base station side according to an embodiment of the present disclosure may also be implemented by the controller 2321. For example, the controller 2321 may execute at least a part of functionality of the processing circuit and/or the respective units of the electronic device or the wireless communication device on the base station side according to the embodiment of the present disclosure by executing the program stored in the memory 2322.

In the above description of specific embodiments of the present disclosure, features described and/or illustrated with respect to one embodiment may be used, in the same or similar manner, in one or more other embodiments, combined with features in the other embodiments, or replace features in other embodiments.

It should be emphasized that the term "comprising" or "including" is used herein to mean the presence of a feature, an element, a step, or a component, but does not exclude the presence or addition of one or more other features, elements, steps or components.

In the above embodiments and examples, reference numerals made up of numbers have been used to indicate various steps and/or units. Those skilled in the art will understand that these reference numerals are only for convenience of description and drawing, and are not intended to represent its order or any other limitation.

Further, the method according to the present disclosure is not limited to being performed in the time order described in the specification, and may also be performed in other time orders, in parallel, or independently. Therefore, the order of execution of the methods described in the present specification does not limit the technical scope of the present disclosure.

While the preset disclosure has been disclosed above by a description of specific embodiments of the present disclosure, it should be understood that, all of the above embodiments and examples are illustrative, but not limiting. Various modifications, improvements or equivalents of the present disclosure may be devised by those skilled in the art within the spirit and scope of the appended claims. Such modifications, improvements, or equivalents should also be considered to be included within the scope of protection of the present disclosure.

The invention claimed is:

1. An electronic device for wireless communication, comprising:
   processing circuitry configured to generate a discovery reference signal (DRS) for an unlicensed band;
   wherein the DRS contains a primary synchronization signal (PSS), a secondary synchronization signal (SSS) and a channel state information reference signal (CSI-RS),
   wherein in frequency domain, the CSI-RS is full-bandwidth, and the PSS and the SSS only occupy a predetermined number of central subcarriers,
   wherein the processing circuitry is further configured to control to respectively transmit the DRS block in different beam directions, and
   wherein the DRS block contains information relating to a transmission beam index related to the different beam directions.

2. The electronic device according to claim 1, wherein the PSS, the SSS and the CSI-RS constituting one DRS block occupy successive orthogonal frequency division multiplexing (OFDM) symbols.

3. The electronic device according to claim 1, wherein the PSS, the SSS and the CSI-RS in the same DRS block are within the same time slot.

4. The electronic device according to claim 1, wherein one DRS block has a length of at least four orthogonal frequency division multiplexing (OFDM) symbols.

5. The electronic device according to claim 1, wherein in one DRS block, the PSS and the SSS are arranged before the CSI-RS.

6. The electronic device according to claim 1, wherein one DRS block contains two successively arranged CSI-RSs.

7. The electronic device according to claim 1, wherein a signal arrangement order in the DRS block comprises:
   PSS, SSS, CSI-RS, CSI-RS;
   PSS, CSI-RS, SSS, CSI-RS;
   CSI-RS, PSS, SSS, CSI-RS;
   PSS, CSI-RS, CSI-RS, SSS;
   CSI-RS, PSS, CSI-RS, SSS;
   CSI-RS, CSI-RS, PSS, SSS;
   SSS, PSS, CSI-RS, CSI-RS;
   SSS, CSI-RS, PSS, CSI-RS;
   CSI-RS, SSS, PSS, CSI-RS;
   SSS, CSI-RS, PSS;
   CSI-RS, SSS, CSI-RS, PSS; or
   CSI-RS, CSI-RS, SSS, PSS.

8. The electronic device according to claim 1, wherein the processing circuitry is configured to generate a DRS burst composed of a predetermined number of DRS blocks, wherein the predetermined number is determined based on an operation frequency point.

9. The electronic device according to claim 8, wherein for an operation frequency point in a frequency band less than 3 GHz, each DRS burst contains up to 4 DRS blocks; for an operation frequency point in a frequency band greater than 3 GHz and less than 6 GHz, each DRS burst contains up to 8 DRS blocks; for an operation frequency band in a frequency band greater than 6 GHz and less than 52.6 GHz, each DRS burst contains up to 64 DRS blocks.

10. The electronic device according to claim 1,
    wherein the processing circuitry is further configured to control to transmit the DRS with a subcarrier spacing shorter than a subcarrier spacing corresponding to 15 kHz or
    wherein the processing circuitry is configured to control to transmit the DRS with a subcarrier spacing corresponding to 120 kHz, 240 kHz or 480 kHz.

11. The electronic device according to claim 1, wherein the processing circuitry is further configured to: when DRSs to be transmitted cannot be completely transmitted within a currently configured discovery measurement timing configuration (DMTC) window period, control to transmit the DRS using an extended DMTC window.

12. The electronic device according to claim 11, wherein the processing circuitry is further configured to: control to notify a user equipment of a size of the extended DMTC window by a licensed frequency band.

13. The electronic device according to claim 1, wherein the processing circuitry is further configured to control to:
    transmit the DRS based on an omnidirectional channel energy detection;
    transmit the DRS based on a directional channel energy detection; or
    transmit the DRS based on a combination of an omnidirectional channel energy detection and a directional channel energy detection.

14. The electronic device according to claim 13, wherein a manner of the combination of the omnidirectional channel energy detection and the directional channel energy detection comprises:
    performing the omnidirectional channel energy detection, and directionally transmitting the DRS if it is detected that a target channel is idle;
    if the omnidirectional channel energy detection indicates that the target channel is non-idle, performing the directional channel energy detection, directionally transmitting the DRS for a direction detected as being idle, and not transmitting the DRS for a direction detected as being non-idle.

15. The electronic device according to claim 1, wherein the processing circuitry is further configured to control to transmit the DRS with a discovery measurement timing configuration (DMTC) period less than 40 ms.

16. A wireless communication method by a communication device having a processor, the method comprising:
generating a discovery reference signal (DRS) for an unlicensed band; and
transmitting the DRS with a subcarrier spacing higher than 15 kHz,
wherein the DRS contains a primary synchronization signal (PSS), a secondary synchronization signal (SSS) and a channel state information reference signal (CSI-RS), and
wherein in frequency domain, the CSI-RS is full-bandwidth, and the PSS and the SSS only occupy a predetermined number of central subcarriers,
wherein the method further comprises controlling to respectively transmit the DRS block in different beam directions, and
wherein the DRS block contains information relating to a transmission beam index related to the different beam directions.

17. A wireless communication method by a communication device having a processor, the method comprising:
generating a discovery reference signal (DRS) for an unlicensed band; and
transmitting the DRS based on a combination of an omnidirectional channel energy detection and a directional channel energy detection,
wherein a manner of the combination of the omnidirectional channel energy detection and the directional channel energy detection comprises:
performing the omnidirectional channel energy detection, and directionally transmitting the DRS if it is detected that a target channel is idle;
if the omnidirectional channel energy detection indicates that the target channel is non-idle, performing the directional channel energy detection, directionally transmitting the DRS for a direction detected as being idle, and not transmitting the DRS for a direction detected as being non-idle.

18. An electronic device for wireless communication, comprising:
processing circuitry configured to
generate a discovery reference signal (DRS) for an unlicensed band; and
transmit the DRS based on a combination of an omnidirectional channel energy detection and a directional channel energy detection,
wherein a manner of the combination of the omnidirectional channel energy detection and the directional channel energy detection comprises:
performing the omnidirectional channel energy detection, and directionally transmitting the DRS if it is detected that a target channel is idle;
if the omnidirectional channel energy detection indicates that the target channel is non-idle, performing the directional channel energy detection, directionally transmitting the DRS for a direction detected as being idle, and not transmitting the DRS for a direction detected as being non-idle.

\* \* \* \* \*